US006905362B2

(12) United States Patent
Williams

(10) Patent No.: US 6,905,362 B2
(45) Date of Patent: Jun. 14, 2005

(54) ELECTRIC VEHICLE BATTERY RAPID CHARGING CONNECTOR

(76) Inventor: Roger C. Williams, 2024 Pueblo Ct., Santa Rosa, CA (US) 95409

( * ) Notice: Subject to any disclaimer, the term of this patent is extended or adjusted under 35 U.S.C. 154(b) by 275 days.

(21) Appl. No.: 09/916,966

(22) Filed: Jul. 27, 2001

(65) Prior Publication Data

US 2002/0081486 A1 Jun. 27, 2002

Related U.S. Application Data

(60) Provisional application No. 60/221,613, filed on Jul. 28, 2003.

(51) Int. Cl.[7] ................................................ H01R 3/00
(52) U.S. Cl. ..................... 439/490; 439/913; 439/924.1
(58) Field of Search ..................... 439/34, 488, 490, 439/453, 374, 310–319, 913, 924.1, 911, 320, 372, 352

(56) References Cited

U.S. PATENT DOCUMENTS 5,242,315 A * 9/1993 O'Dea ........................ 439/577
5,751,135 A * 5/1998 Fukushima et al. ......... 320/107
6,210,036 B1 * 4/2001 Eberle et al. ................ 439/913

* cited by examiner

*Primary Examiner*—Tho D. Ta
(74) *Attorney, Agent, or Firm*—Risto A. Rinne, Jr.

(57) ABSTRACT

An apparatus for connection of a rapid charging system to an electric vehicle includes a connector plug that is attached to an electrical cable at one end that is, in turn, connected to a charging system at the remaining end of the cable. The connector plug is adapted to fit into a mating receptacle that is attached to the electric vehicle. A pair of cavities in the connector plug are adapted to receive any combination of modules that include switches, lights, or blank filler plugs. The connector plug is preferably molded from rubber. Various contacts are described having high current, or signal, or pilot functions and which mate with various length pins in the mating receptacle so as to sequence the order in which electrical conductivity is attained. Temperature sensing of the connector and shutdown subsequent to an over-temperature condition is described and allows for the use of smaller sized electrical connectors.

15 Claims, 1 Drawing Sheet

ELECTRIC VEHICLE BATTERY RAPID CHARGING CONNECTOR

This application claims the benefit of priority of Provisional Patent Application Ser. No. 60/221,613 that was filed on Jul. 28, 2000.

BACKGROUND OF THE INVENTION

1. Field of the Invention

The present invention, in general relates to electrical connectors and, more particularly, to high current (200–600 amperes) connectors that are intended to rapidly charge the batteries of an electric vehicle (i.e., a vehicle that obtains at least some of its motive power from an electric motor).

As electrically powered and hybrid types of electric and gasoline vehicles continue to grow in design and in popularity, so too does the need to better support these types of vehicles.

Certain of these types of vehicles are driven on the street while others are used in specific areas, such as in airports for the towing of airplanes, baggage, or for other purposes, for example, as fork lifts.

Another group of electrical vehicles that may benefit from rapid recharging is classified, generally, as "Neighborhood Electric Vehicles". These vehicles, while street legal, are limited to speeds under 30 mph and are becoming increasingly popular for use in retirement communities.

As used throughout this specification, the term "electric vehicle" is intended to include any type of an electrically powered vehicle.

Regardless of where they are used, the need to rapidly recharge the batteries of an electric vehicle exists. As this technology continues to advance, new types of batteries and new types of charging systems are being designed. It is desirable, in general, to be able to charge an electric vehicle as rapidly as possible. Rapid charging minimizes downtime.

Various standards for recharging electric vehicle batteries presently exist and new ones are likely to be developed. For example, according to SAE J1772 "Society of Automotive Engineers Specification", a "level 3" charge method utilizes 400 amperes maximum charge current and allows a discharged battery to be charged to approximately 80% of its capacity in a short period of time. Clearly, a very large amount of current must be supplied to accomplish recharging within the allotted time frame. (The verbs "charge" and "recharge" or "charging" and "recharging" are used interchangeably herein.)

By way of comparison, a "level 1" rate of charging involves only twelve amperes maximum charge current and requires from six to twelve hours to reach the same battery capacity.

In order to accommodate high current flows, large connectors are used but these then result in high insertion and removal forces which make it difficult for users to connect the charging system plug to the electric vehicle or remove it therefrom.

It has generally been accepted that a hazardous voltage is 48 volts or higher when conditions are dry and 30 volts or higher when conditions are wet.

At airports, electric vehicles operate at from 48 to 150 volts DC. Accordingly, protection from electrical hazard is required for those who handle the electrical connectors that recharge these vehicles.

Also, there are other functions and indications that are desirable on a connector (i.e., a plug) for connection to an electric vehicle but which are currently unavailable. For example, an on/off switch to control operation of the recharging system (i.e., the application of electrical power for recharging the electric vehicle's battery through the connector) is desirable.

As electric vehicle recharging systems grow in sophistication, there may arise a desire to control any of a variety of other functions as well. The use of indicator lights may also be desirable at times and they may used to indicate any condition, such as proper connection of the plug to the mating receptacle, proper or improper rate of charging, power "on" or "off", etc . . .

Accordingly, there exists today a need for an electric vehicle battery rapid charging connector that has a lower insertion and removal force, incorporates safeguards, and which provides for additional functionality.

2. Description of Prior Art

High current electrical connectors are, in general, known. While the structural arrangements of the above described devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an electric vehicle battery rapid charging connector that has a lower insertion force than similar capacity types of prior art electrical connectors.

It is also an important object of the invention to provide an electric vehicle battery rapid charging connector that is versatile.

Another object of the invention is to provide an electric vehicle battery rapid charging connector that is adapted to permit temperature sensing of the battery that is being charged or, alternately, of the connector itself, or both.

Still another object of the invention is to provide an electric vehicle battery rapid charging connector that is adapted to supply a signal to a charging system whereby the charging system can respond to an over-temperature condition by shutting down or otherwise limiting its operation.

Still yet another object of the invention is to provide an electric vehicle battery rapid charging connector that includes a cavity that is adapted to accept either one or a plurality of modules, the modules including any combination of indicator lights and/or switches or a blank cover that is adapted to block access to the cavity.

Yet another important object of the invention is to provide an electric vehicle battery rapid charging connector that includes smaller sized contacts (i.e., socket and pin) than other similar capacity types of electrical connectors.

Still yet another important object of the invention is to provide an electric vehicle battery rapid charging connector that embodies safeguards for use.

Still yet one further object of the invention is to provide an electric vehicle battery rapid charging connector that is durable and rugged.

Still yet one further important object of the invention is to provide an electric vehicle battery rapid charging connector that has a lower insertion force for inserting a plug into a mating receptacle than other types of similar capacity connectors.

Briefly, an electric vehicle battery rapid charging connector that is constructed in accordance with the principles of the present invention has a rubber or plastic molded body that includes a predetermined size and shape. The connector includes two large DC power contacts and 1 large grounding contact and six smaller signal contacts. The smaller signal contacts may be used for functions such as battery or connector temperature sensing, voltage sensing, pilot, and other functions, as desired. Preferably, silver plated copper socket contacts that are crimped onto conductors that are contained in an electrical cable are used. The connector may include two cavities that can each accept either a module or a rubber blank. Each module may include any combination of on/off switches or indicator lights, as desired. When mating occurs (i.e. when the connector plug is inserted into a mating receptacle that is attached to the electric vehicle), connection of electrical ground is accomplished first, followed by the positive and negative high current contacts, followed by five of six control signals making contact, followed lastly by a pilot pin making contact which enables current flow to occur after all of the other connections are first ensured. Sequenced electrical connectivity is accomplished by controlling the length of the pins in the mating receptacle. Removal of the connector plug from the mating receptacle reverses the order of disconnection and ensures that current flow has ceased prior to disconnection of the power contacts.

DETAILED DESCRIPTION OF THE INVENTION

Figure 1:
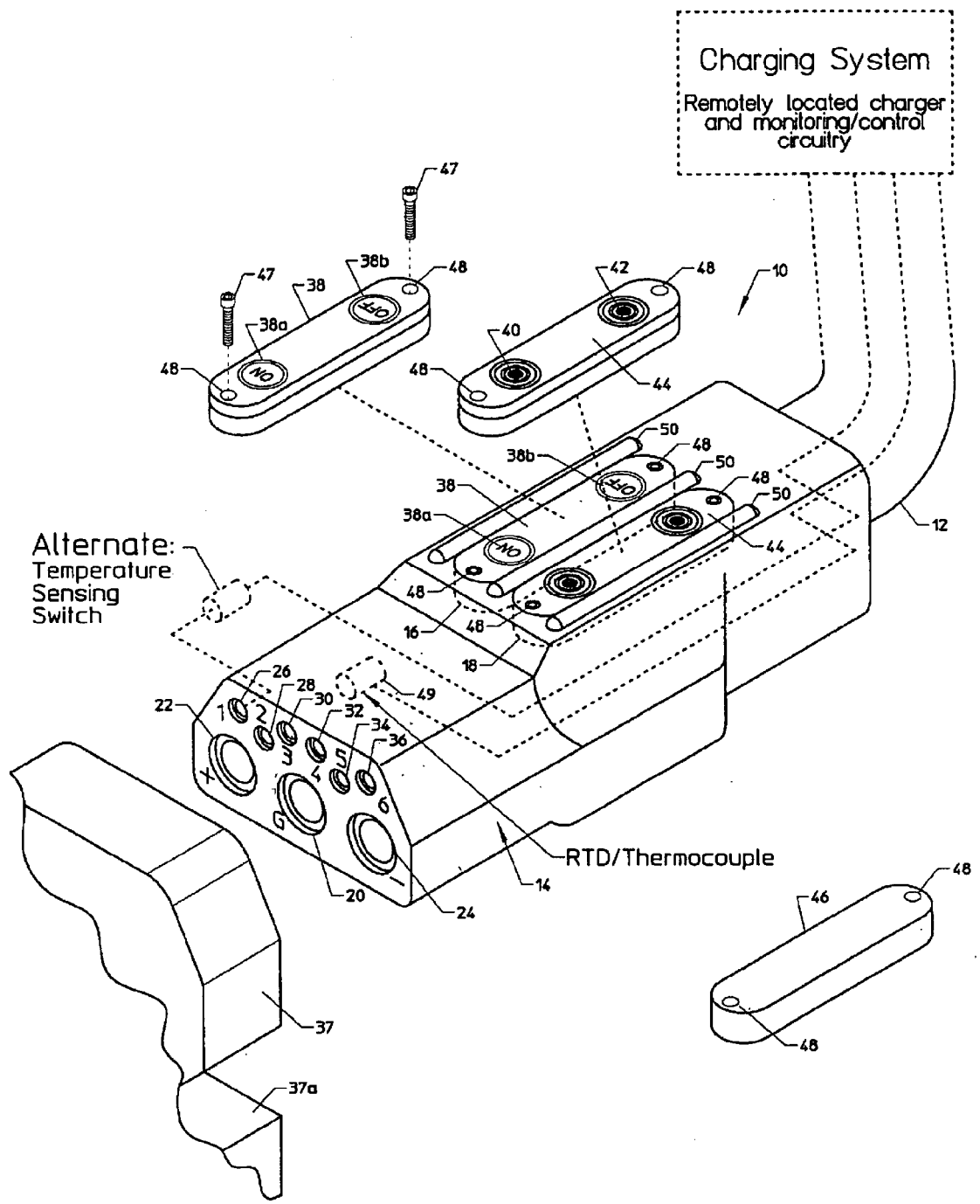
FIG. 1 is view in perspective an electric vehicle battery rapid charging connector with a plurality of modules inserted therein.

Referring to FIG. 1 is shown, a plug half of an electric vehicle battery rapid charging connector, identified in general by the reference numeral 10 that includes a predetermined size and shape, the shape being generally as shown.

A cable 12 which contains the necessary electrical conductors enters into t he back of the connector 10.

A body, identified in general by the reference numeral 14, is rubber or plastic molded and includes a first and second cavity 16, 18 (shown in dashed lines) that are formed therein.

A ground socket 20, a positive charging socket 22, and a negative charging socket 24 are included in a distal end of the connector 10 that is opposite the back and are large enough to carry the maximum required charging current for a predetermined period of time, as is described in greater detail hereinafter.

Six smaller signal contact sockets 26, 28, 30, 32, 34, 36 are also provided in the distal end proximate the ground socket 20, the positive and negative charging sockets 22, 24 which are used for temperature sensing, voltage sensing, pilot connection, and for other purposes, as desired.

When the connector 10 is inserted into a mating receptacle 37 that is attached to an electric vehicle 37a (Only a small portion of a mounting bracket is shown, the mounting bracket being attached to and therefore part of the electric vehicle 37a.), the various electrical connections are made at different times as insertion progresses.

This is accomplished by controlling the length of the pins (not shown) that are in the receptacle 37. The longest pin is a ground pin and it makes electrical contact with the ground socket 20 before any other connection is made.

The second longest set of pins are a positive pin and a negative pin that mate with the positive charging socket 22 and the negative charging socket 24.

Five signal pins are the third longest set of pins that are included in the receptacle 37 and they are shorter than the second longest set of pins. The five signal pins mate with five of the six smaller signal contact sockets 26, 28, 30, 32, 34 and are used for temperature or voltage sensing (of a battery or batteries in the electric vehicle) and to control other functions, as desired.

A sixth signal pin is the shortest of all of the pins in the receptacle 37 and is therefore last to make electrical connection with the sixth signal contact socket 36 of the connector 10. The sixth signal contact socket 36 is preferably used to complete a pilot connection.

For example, the circuit may be completed through the receptacle 37 and back through one of the other signal pins through the corresponding signal contact socket (26, 28, 30, 32, or 34) and back through the cable 12 to a charging system (not shown).

When the pilot connection is complete, the charging system is then able to determine that the connector 10 has been fully inserted into the receptacle 37 and that the charging system may now, if desired, begin to apply rapid charging current through the positive and negative sockets 22, 24 and, if desired, to sense other parameters being monitored and, if desired, to control other functions, as is described in greater detail hereinafter.

Any or all of the sockets 20, 22, 24, 26, 28, 30, 32, 34, 36 are preferably silver plated copper socket contacts that are crimped onto conductors that are contained in the electrical cable 12.

To minimize the amount of insertion force that is required to insert the connector 10 into the receptacle 37, any of the sockets 20, 22, 24, 26, 28, 30, 32, 34, 36 preferably may include a split tine type of a socket as is described in Provisional Patent Application, Ser. No. 60/221,612 filed on Jul. 28, 2000 by the same inventor, and which is included by reference herein.

While according to the above description, the sixth signal pin is the shortest and mates with the sixth signal contact socket 36, it is of course possible to have the shortest sixth signal pin mate disposed elsewhere in the receptacle 37 so that it mates with any of the six smaller signal contact sockets 26, 28, 30, 32, 34, 36, as may be desired.

It is also possible to vary the length of any of the pins so as to modify the sequence that electrical connections are made when the connector 10 is inserted in the receptacle 37.

It is also possible to change the location of the pins and sockets so that sockets are disposed in a modified receptacle and pins are disposed in a modified connector.

When the connector 10 is pulled from the receptacle 37, electrical connection is broken in reverse order, namely the last socket(s) to make connection during insertion is the first to lose it during removal.

A first module 38 is shown disposed above the first cavity 16 for purposes of clarity and also in the first cavity 16 where it belongs so that its top is approximately flush with the top surface of the body 14 at that area. The first module 38 contains an "on" switch 38a and an "off" switch 38b that can be depressed to turn "on" or "off" any desired function.

For example, the "on" switch 38a of the first module 38 can be used to turn "on" charging power when either of a pair of indicator lights 40, 42 of a second module 44 indicate that all conditions for doing so have been satisfied. This can be done in lieu of, or in conjunction with the pilot connection, depending upon the degree of safeguards that are desired.

The second module 44, as shown, is disposed above the body 14 (for clarity) and also in the second cavity 18 where it is normally disposed.

A third module 46 is a rubber blank and it can be inserted to fill (i.e., block) either the first cavity 16, or the second cavity 18, or both, as desired when a pair of the third modules 46 are used.

The modules 38, 44, 46 are secured in place in the cavities 16, 18 as desired. One possible way is by screws 47 passing through a pair of openings 48 in each of the modules 38, 44, 46 and making contact with the body 14 proximate the cavities 16, 18 sufficient to retain the modules 38, 44, 46 therein.

Sensing of the temperature and/or voltage of the battery can be accomplished by the charging system (via the six smaller signal contact sockets 26, 28, 30, 32, 34, 36) to verify that a proper recharging cycle is taking place. If an anomaly is detected, the charging system can shut down and abort the recharging cycle. If desired, one of the indicator lights 40, 42 can then be illuminated to indicate that this (i.e., a fault condition) has occurred.

Prior art connector design (not shown) requires that the pins and sockets must be large enough to carry the intended current load and to do so indefinitely. This is because in other prior art applications the duty cycle may be expected to vary from zero anywhere up to 100% and therefore, the maximum current may have to be delivered constantly. Therefore, the pins and sockets must be able to handle this load indefinitely and so they are made large enough to do so. Those skilled in prior art connector design routinely design the pins and sockets so that they can indefinitely handle the greatest current that they will normally experience by using larger types of connector pins and sockets. Larger connector mating (i.e., pins and sockets) is disadvantageous because it requires greater insertion (and withdrawal) force for mating and un-mating to occur. It also results in physically larger and heavier connectors.

However, rapid battery charging of electric vehicle batteries does not maintain maximum current flow throughout the entire charging (recharging) cycle. Rather, the rate of charging (i.e., current flow) decreases as the battery or batteries become more fully charged. Accordingly, the pins and sockets that carry the charging load (and ground) of the instant invention 20, 22, 24 may be made smaller than what would be required to sustain a continuous maximum load, provided that other safety controls to limit the current flow either over time or upon the occurrence and detection of other abnormal conditions are also provided.

During a normal charging cycle, a very high rate of current flow will initially occur and this rate will decrease over time. The battery temperature and voltage sensing capabilities discussed above can be used by the charging system to detect improper operation (in the electric vehicle 37a) which, if detected, could then result in a cessation of charging current flow through the connector 10.

An increase in the temperature of the connector 10 itself is another condition that can be caused by several factors, including an excessively high rate of charge that exceeds the current carrying capacity of the connector 10, a protracted rate of a maximally permissible current flow that exceeds the maximum permissible time, or a failure in any of the positive, negative, or ground contact sockets 20, 22, 24. Any of these conditions will result in an increase (i.e., a rise) in the temperature of the connector 10.

A failure, for example, in the contact sockets 20, 22, 24 could be of the form of an increase in the electrical resistance between the socket 20, 22, 24 and its mating pin, such as from dirt or insufficient contact pressure. An increase in electrical resistance would cause an increase in power consumption in the connector 10 to occur, which would then cause a rise in temperature to occur.

If this were to continue undetected the potential for damage is great. The battery or batteries in the electric vehicle 37a may be damaged, or the electric vehicle 37a might suffer damage resulting from great heat. Similarly, the connector 10 itself could become damaged.

Any of the six smaller signal contact sockets 26, 28, 30, 32, 34, 36 can, if desired, be connected to a resistance temperature detector 49 (hereinafter as "the RTO 49") (i.e., a method or device for sensing or otherwise determining the temperature of the connector 10, such as a thermocouple). The resistance of the RTO 49 changes with temperature and so it is used to provide an electrical signal that is proportionate to the temperature of the connector 10 and this signal is monitored by the charging system.

If a maximum threshold temperature is exceeded, it can be assumed that either a failure has occurred or that some other improper and potentially unsafe condition has arisen.

Accordingly, the charging system would then either reduce or interrupt the charging current once the maximum permissible operating temperature of the connector 10 was exceeded.

Alternatively, this functionality may also be achieved by the use of a temperature sensing switch attached to the connector 10 which would interrupt the pilot circuit when a predetermined temperature is exceeded.

This provides a method for determining and for monitoring the temperature of the connector 10. This, in turn, provides a more reliable mechanism whereby smaller contacts may be used in high current applications that would otherwise be impossible because current flow through the smaller contacts (i.e., sockets) can be stopped (or lessened) if any type of a fault condition causes a dangerous temperature rise to occur in the connector 10.

A signal indicating the temperature of the connector 10 is supplied to the charging system which then controls current flow through the connector 10. Other signals indicating the temperature and voltage of the electric vehicles battery or batteries (or any other desired parameter) are also supplied to the charging system. All component parts, therefore, cooperate together so as to provide a system for ensuring the controlled and rapid charging of the electric vehicle's 37a battery or batteries.

As rapid charging systems continue to develop, they will deliver very large amounts of current (i.e., power) in increasingly shorter periods of time. The need to monitor system parameters to prevent damage from occurring is therefore also increasing. The connector 10 provides the versatility and improved functionality to permit such monitoring to occur.

To facilitate use, three raised ridges 50 are provided on the outside edges and intermediate the two cavities 16, 18 of the connector 10 that extend longitudinally the length of the cavities 16, 18. The ridges 50 help ensure that the fingers of a user can readily find the desired switches and they also protect the modules from damage.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An electric vehicle rapid charging connector, comprising:
   (a) a connector plug having a body, said body having a first end and an opposite second end;
   (b) means for attaching an electrical cable at said first end of said body, said electrical cable including a plurality of electrical conductors therein;
   (c) means for providing a plurality of sockets at said second end of said body, at least two of said plurality of sockets adapted for recharging a battery of said electric vehicle; and
   (d) means for providing at least one cavity in said body and including means for determining a temperature of said connector and wherein said means for determining a temperature is adapted to affect a current that is flowing through at least one of said plurality of electrical conductors subsequent to said temperature exceeding a predetermined threshold amount; and wherein said cavity is adapted to receive a module and wherein said module includes at least one indicator light, said at least one indicator light attached to at least one of said plurality of electrical conductors.

2. The electric vehicle rapid charging connector of claim 1 wherein said module includes at least one switch, said at least one switch attached to at least one of said plurality of electrical conductors.

3. The electric vehicle rapid charging connector of claim 1 wherein said module includes at least one blank, said at least one blank adapted for covering an opening into said at least one cavity.

4. The electric vehicle rapid charging connector of claim 1 wherein said means for determining a temperature includes at least one device selected from the group consisting of resistance temperature detector, thermocouple, and temperature sensing switches.

5. The electric vehicle rapid charging connector of claim 1 wherein said plurality of sockets is adapted to mate electrically with a plurality of pins that are disposed in a receptacle, said receptacle adapted for attachment to said electric vehicle.

6. The electric vehicle rapid charging connector of claim 5 wherein at least one of said plurality of pins is longer than at least one other of said plurality of pins and whereby said at least one of said plurality of pins that is longer is adapted to mate electrically with at least one of said plurality of sockets before at least one other of said plurality of pins is adapted to mate electrically with at least one other of said plurality of sockets.

7. The electric vehicle rapid charging connector of claim 5 wherein said connector is electrically connected to means for monitoring at least one parameter in said electric vehicle when said connector is electrically connected with said receptacle.

8. The electric vehicle rapid charging connector of claim 1 wherein said means for determining a temperature is attached to a first end of said at least one of said plurality of electrical conductors and including means for monitoring said temperature that is attached to a second end of said at least one of said plurality of electrical conductors.

9. The electric vehicle rapid charging connector of claim 8 wherein said means for monitoring is adapted to affect a current that is flowing through said conductor subsequent to said temperature exceeding a predetermined threshold amount.

10. An electric vehicle rapid charging connector, comprising:
   (a) a connector plug having a body, said body having a first end and an opposite second end;
   (b) means for attaching an electrical cable at said first end of said body, said electrical cable including a plurality of electrical conductors therein;
   (c) means for providing a plurality of sockets at said second end of said body, at least two of said plurality of sockets adapted for recharging a battery of said electric vehicle; and
   (d) means for determining a temperature in said body and wherein said means for determining a temperature is adapted to affect a current that is flowing through at least one of said plurality of electrical conductors subsequent to said temperature exceeding a predetermined threshold amount; and wherein said means for determining a temperature in said body is adapted to supply a signal through said electrical cable, said signal being representative of said temperature in said body.

11. The electric vehicle rapid charging connector of claim 10 including control means that is adapted to receive said signal and wherein the flow of a current that is supplied for charging at least one battery in said electric vehicle through said connector is stopped by said control means subsequent to said temperature in said body exceeding a predetermined threshold amount.

12. The electric vehicle rapid charging connector of claim 10 including control means that is adapted to receive said signal and wherein a current that is supplied for charging at least one battery in said electric vehicle through said connector is lessened by said control means subsequent to said temperature in said body exceeding a predetermined threshold level.

13. The electric vehicle rapid charging connector of claim 12 wherein at least two of said sockets are adapted to carry a maximal flow of current for a predetermined limited amount of time and wherein when said maximal flow of current occurring through at least two of said sockets exceeds said predetermined limited amount of time, said temperature in said body rises and wherein if said maximal flow of current continues for a sufficient amount of time said temperature in said body will exceed said threshold level.

14. The electric vehicle rapid charging connector of claim 13 wherein said at least two of said sockets are smaller than would be required to maintain said maximal flow of current through said at least two of said sockets to continue indefinitely.

15. An electric vehicle rapid charging connector, comprising:
   (a) a connector plug having a body, said body having a first end and an opposite second end;
   (b) means for attaching an electrical cable at said first end of said body, said electrical cable including a plurality of electrical conductors therein;
   (c) means for providing a plurality of sockets at said second end of said body, at least two of said plurality of sockets adapted for recharging a battery of said electric vehicle; and
   (d) means for providing at least one cavity in said body and including means for determining a temperature of said connector and wherein said means for determining a temperature is adapted to affect a current that is flowing through at least one of said plurality of electrical conductors subsequent to said temperature exceeding a predetermined threshold amount; and wherein said cavity is adapted to receive a module and wherein said module includes at least one switch, said at least one switch attached to at least one of said plurality of electrical conductors.

* * * * *